United States Patent [19]

Cohen et al.

[11] Patent Number: 5,090,742
[45] Date of Patent: Feb. 25, 1992

[54] PIPE HARNESS CLAMP

[75] Inventors: Jack L. Cohen, Floral Park, N.Y.; R. Peter Deubler, River Vale, N.J.

[73] Assignee: Aegis Industries, Inc., Secaucus, N.J.

[21] Appl. No.: 477,731

[22] Filed: Feb. 9, 1990

[51] Int. Cl.⁵ ............................................. F16L 13/04
[52] U.S. Cl. .................................... 285/114; 285/373
[58] Field of Search ..................... 285/373, 114, 419; 411/544

[56] References Cited

U.S. PATENT DOCUMENTS

| | | | |
|---|---|---|---|
| 2,713,482 | 7/1955 | Stapleton | 411/544 X |
| 3,153,550 | 10/1964 | Hollett | 285/373 |
| 3,944,265 | 3/1976 | Hiemstra et al. | 285/373 X |
| 4,049,298 | 9/1977 | Foti | 285/373 X |
| 4,135,694 | 1/1979 | Stegenga et al. | 411/544 X |
| 4,417,755 | 11/1983 | Gittleman | 285/373 |
| 4,611,839 | 9/1986 | Rung et al. | 285/373 X |
| 4,653,782 | 3/1987 | Munday | 285/373 |
| 4,702,499 | 10/1987 | deRaymond et al. | 285/373 X |
| 4,720,223 | 1/1988 | Neights et al. | 411/544 X |
| 4,789,189 | 12/1988 | Robertson | 285/373 X |
| 4,871,198 | 10/1989 | Hattori et al. | 285/373 |

FOREIGN PATENT DOCUMENTS 0567222 9/1975 Switzerland ..................... 285/373

*Primary Examiner*—Dave W. Arola
*Attorney, Agent, or Firm*—Fleit, Jacobson, Cohn, Price, Holman & Stern

[57] ABSTRACT

A pipe harness clamp for use when two pipes, which may be of different materials, are axially coupled, includes arcuate clamping portions for contacting outer surfaces of a pipe and radially extending portions for bolting together. An elastomeric liner is fitted around the pipe, under the clamp, to assure a close fit between the pipe contour and the clamp. Stiffening gussets extend on the outside of the clamp between the arcuate clamping portions and the radially extending portions, in a plane substantially perpendicular to the axis of the pipe. Preload washers, such as disk washers, are provided on the clamping bolts to control preload. A plurality of washers may be used on each bolt. Belleville washers are preferred. The belleville washers compensate for any relaxation of the clamp halves and bolts and preload is not significantly reduced, thus maintaining load capacity of the clamp.

7 Claims, 2 Drawing Sheets

PIPE HARNESS CLAMP

FIELD OF THE INVENTION

This invention relates to a pipe harness clamp useful when pipes are joined.

BACKGROUND OF THE INVENTION

Harness clamps for use when pipes are axially coupled are known in the art, but known clamps are not satisfactory in maintaining preload. The clamp halves and bolts may relax and initial preload is lost, resulting in leakage of fluids carried by the pipes.

Known prior art systems include that of Rung, et al. U.S Pat. No. 4,611,839, which describes a self-adjusting pipe clamp and coupling having buttresses including bolting pads. The ends of the coupling segments include inclined end faces for cooperation with the corresponding inclined end faces of an adjacent coupling segment to produce self-adjustment of the coupling and rigid clamping of the pipe ends upon tightening down of the coupling. The end portions of the clamp halves function as bolting pads. Springs for maintaining preload are not used.

Kennedy, Jr. et al., U.S. Pat. No. 4,026,586, describes a corrugated clamp for joining plain ends of pipe. An elastic gasket member serves as a liner between the clamp and pipes. Reenforcing plates are attached to ends of the corrugated clamping strip, and load deformation is absorbed by the corrugated strip.

The patent to Faint, U.S. Pat. No. 3,204,665, describes a pipe clamp including a gasket liner. Side casting lugs are described and bolts are each seated in a depression in a lug. The patent to Graham, et al., U.S. Pat. No. 3,089,212, describes another pipe clamp including a sealing gasket. An opposed lug structure is described to avoid bending of the bolts during tightening. Muto, U.S. Pat. No. 1,928,316, describes a pipe coupling having a bushing or packing of soft material.

Known prior patents do not address the problem of maintaining preload.

SUMMARY OF THE INVENTION

A pipe harness clamp for maintaining preload in axially coupled pipes, may be used on one or both of the coupled pipes. The pipes may be of different materials. The clamp includes arcuate clamping portions having radial extensions at each side for bolting together. An elastomeric liner is fitted around the pipe, under the clamp, to assure a close fit between pipe contour and clamp.

Gussets extend between the arcuate clamping portions and the radially extending portions, in a plane substantially perpendicular to the axis of the coupled pipes, between the clamping bolts, and serve to stiffen the clamp by resisting the clamping force. Washers, such as disk washers, are provided on the clamping bolts for maintaining preload. A plurality of washers may be used on each bolt. Belleville washers are preferred. The bolts are pretensioned and the washers compensate for any relaxation of the bolts in use. Preload is not significantly reduced and clamp load capacity is maintained.

DETAILED DESCRIPTION OF THE INVENTION

Figure 1:
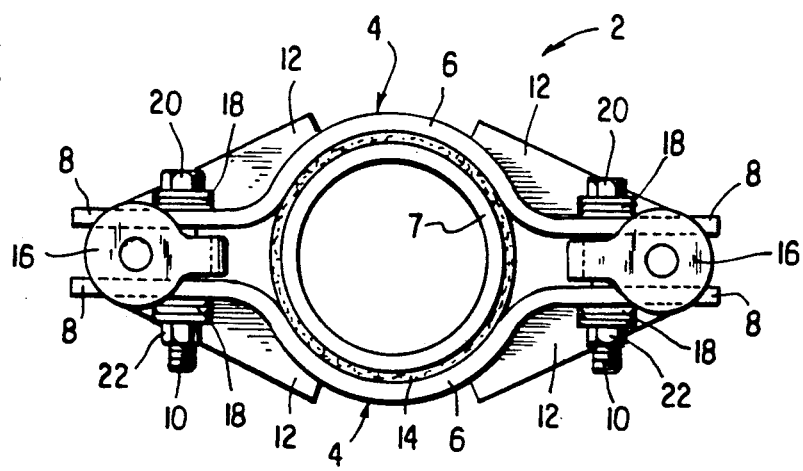
FIG. 1 is an elevational view of a clamp of the invention.

A pipe harness clamp of the invention is useful when pipes of similar or dissimilar materials, used for transporting gas, oil, water or other fluid, are axially joined. A clamp of the invention prevents the pipe joint from rupturing by stiffening the joint so that it can withstand maximum axial forces without any slippage. The clamp substantially eliminates stress at the joint interface, and is applied to one or both pipes adjacent or spaced from the coupling at the pipe joint. The joined pipes may be of the same or different materials. An elastomeric liner accommodates irregularities in the outside diameter and surface of a clamped pipe. In non-limiting examples, a pipe harness clamp of the invention is useful when axially joining a cast iron pipe to a steel pipe, or when joining pipes of similar materials.

Any material under stress tends to relax over time and pipes of different materials relax at different rates due to their different coefficients of expansion. Also, bolts tend to stretch. Use of washers, such as belleville washers, between the clamp halves and the bolts, compensates for the stretch caused by relaxation and keeps the bolts tight. This is particularly advantageous when joining pipes of different materials, as the difference in relaxation rates of the different materials is accommodated by the clamp, without causing leakage of fluid by rupture of the sleeve coupling.

A clamp of the invention requires no field welding and, therefore, the installer avoids any danger associated with welding pipes carrying combustible fluids. Because the clamp functions strictly by clamping pressure and frictional forces, no mechanical alterations to the pipes are necessary for installing the clamp. No permanent connections are needed, and this drastically reduces installation time and cost and permits simple adjustment in the field.

The axial load carrying capacity of the clamp is assured through the control of the clamping force. Clamping force control is obtained both by using a liner to assure a close fit between the clamp and the pipe contour and by using preload washers, such as belleville washers, to ensure that the preload is achieved and maintained. Further, the clamp is flexible enough to achieve a proper fit around the contour of the pipe and rigid enough so that preload relaxation is minimized. An elastomeric liner is fitted under the clamp to compensate for variations between the pipe contour and the clamp.

The portion of the clamp from the pipe contact area to the loading point on the radially extending portions of each clamp half is reinforced with gussets which extend in a plane substantially perpendicular to the longitudinal axis of the pipe. The gussets provide stiffness for resisting the clamping force, so that the clamp relaxes less than an unreinforced clamp. Gussets may be positioned between the clamping bolts, or otherwise as known to one skilled in the art. However, a substantial portion of the clamp in contact with the pipe is not reinforced and is, therefore, flexible, so that it can deflect to conform to the outside diameter of the pipe, thus providing an advantageous combination of stiffness and flexibility.

Preload is controlled by using washers, preferably cone-shaped disk washers such as belleville washers, on the clamping bolts. Belleville washers are preferred since the conical shape allows maximum preload to be maintained. Preload is achieved by pretensioning the bolts and can be verified by measuring the height of the washers between the clamp and bolt head. Using conventional clamps, without belleville washers, preload is lost as the bolts relax, and joint stiffness is consequently reduced. In contrast, when using the clamp of the invention, the belleville washers compensate for the relaxation of the bolts and preload is not significantly reduced. Thus, the preload and the clamp load capacity are maintained. Several disk washers may be stacked on each clamping bolt.

Figure 2:
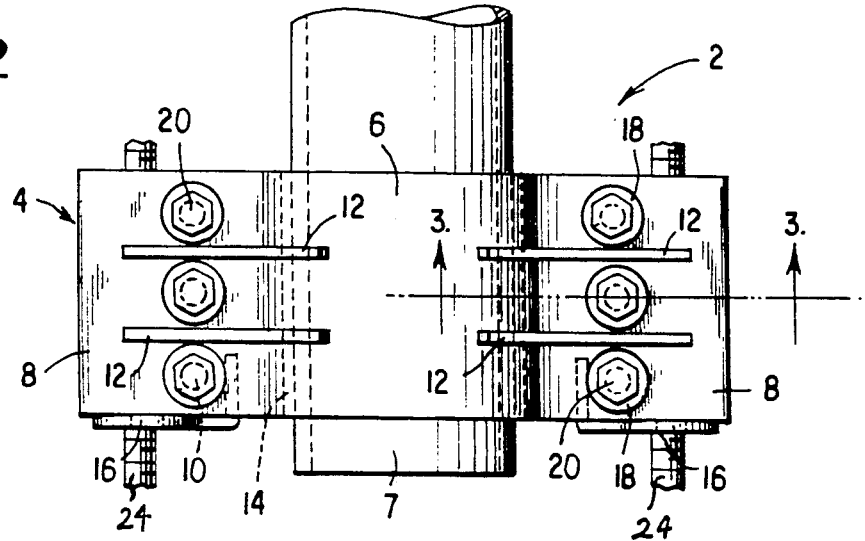
FIG. 2 is a top view of the invention of FIG. 1.
Figure 3:
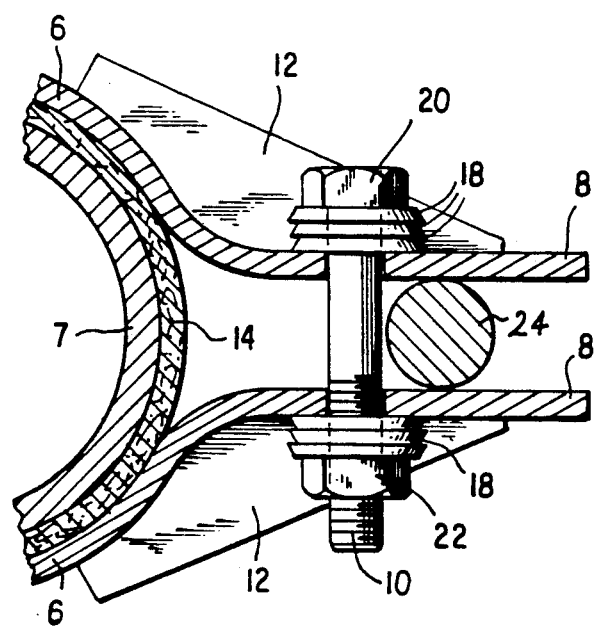
FIG. 3 is a cross-sectional view taken on line 3—3 of FIG. 1.
Figure 4:
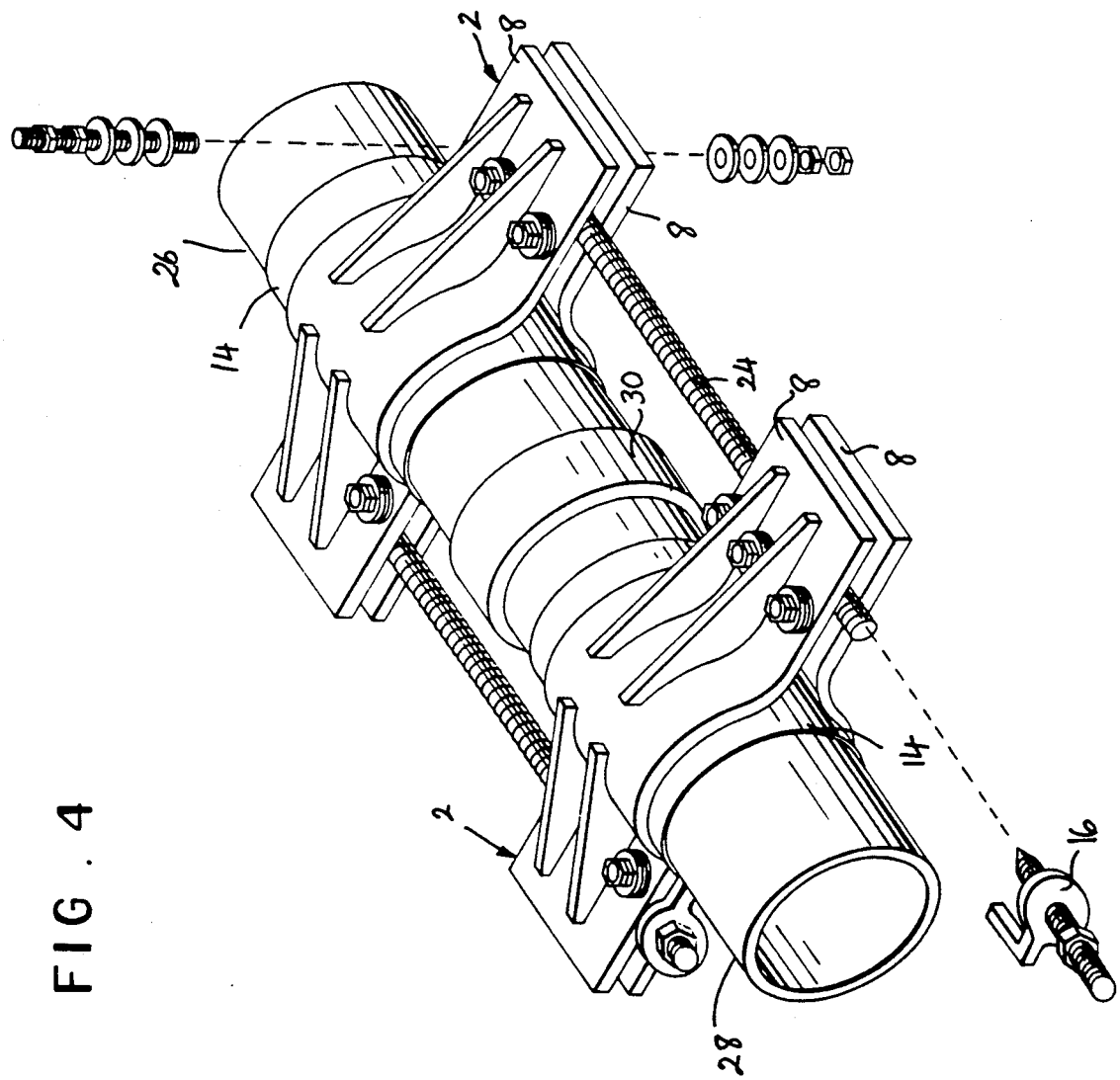

With reference to the Figures, in which like numerals represent like parts, FIGS. 1 to 3 show clamp 2 which includes two clamp halves 4, each including a pipe contacting portion 6 and a pair of radially extending portions 8, attached to the pipe contacting portions 6, extending on each side of the pipe. Clamping bolts 10 extend through radially extending portions 8.

Gussets 12 extend from pipe contacting portion 4 to radially extending portion 8 in a plane substantially perpendicular to the longitudinal axis of the pipe. Gussets 8 provide stiffening for the clamp. A liner 14 fits around the clamped pipe, under the clamp halves, to accommodate unevenness in the outer surfaces of the pipe. In non-limiting examples, the liner may be a neoprene liner, ⅛th inch in thickness, or a kevlar liner. Socket clamp washers 16, on clamps on each of the pipes being axially joined, each receive an end of a rod (not shown) extending between the clamps, for tightening therebetween.

Belleville washers 18, which may be of steel, are inserted between radially extending portions 8 and each bolt head 20 and between radially extending portions 8 and each nut 22. A plurality of belleville washers 18 may be stacked together so that forces are transmitted from one washer to the next, without losing preload. Generally, between about 1 and 8 belleville washers are used on each side of a bolt. In a preferred embodiment, between 3 and 5 belleville washers are used on each side of each bolt.

In a non-limiting example of a pipe harness clamp of the invention, the clamp may be fabricated of carbon steel of ⅜ inch thickness and 10 inches wide. The belleville washers may be of steel having spring rates suitable for the required preload. Belleville washers may be obtained from Associated Spring. The bolts are preloaded by torque wrench using a torquing sequence to assure that all bolts are uniformly loaded and the belleville washers compressed.

While the invention has been described above with respect to certain embodiments thereof, it will be appreciated that variations and modifications may be made without departing from the spirit and scope of the invention.

What is claimed is:

1. A pipe harness clamp for stiffening a joint between two coaxially joined pipes by positioning said clamp on at least one of the pipes, spaced away from the joint and spaced away from a coupling at the joint, said clamp comprising:

arcuate means for contacting outer surfaces of a pipe spaced away from the joint between the two coaxial pipes;

radial means extending from said arcuate means for clamping said arcuate means around said pipe;

gusset means extending between said arcuate means and said radially extending means in a plane substantially perpendicular to the axis of said pipe for stiffening the clamp, liner means for fitting around said pipe between said arcuate means and said pipe, clamping means for extending through said radial means and for securing said arcuate means together, and preload washer means on said clamping means for achieving and substantially maintaining preload;

stiffening means attached to the pipe harness clamp secured to one of the pipes extending between said clamp and means on the other pipe for tightening therebetween;

whereby the joint between the pipes is stiffened when said clamp is in place on at least one of the pipes, spaced from the joint between the pipes and when said tightening means is adjusted for withstanding axial forces without slippage.

2. A pipe harness clamp according to claim 1 wherein said preload washer means comprises disk washers.

3. A pipe harness clamp according to claim 2 wherein said disk washers comprise belleville washers.

4. A pipe harness clamp according to claim 2 comprising a plurality of disk washers associated with each clamping means.

5. A pipe harness clamp according to claim 4 wherein the clamping means comprises a plurality of bolts.

6. A pipe harness clamp according to claim 5 wherein said preload washer means comprises between 1 and 8 belleville washers inserted on each bolt between the radially extending means and a bolt head on one side and between the radially extending means and a nut on the bolt on the other side.

7. A pipe harness clamp according to claim 6 comprising between 3 and 8 belleville washers associated with each bolt on each side of the radially extending means.

* * * * *